US006643622B2

(12) United States Patent
Stuart et al.

(10) Patent No.: US 6,643,622 B2
(45) Date of Patent: *Nov. 4, 2003

(54) DATA RETRIEVAL ASSISTANCE SYSTEM AND METHOD UTILIZING A SPEECH RECOGNITION SYSTEM AND A LIVE OPERATOR

(76) Inventors: Robert O. Stuart, 5951 Camelback Ct., Indianapolis, IN (US) 46250; Scott P. Stuart, 771 Catherine St. SW., Atlanta, GA (US) 30310; Don Hornback, 8928 Fathom Crest, Indianapolis, IN (US) 46256

( * ) Notice: Subject to any disclaimer, the term of this patent is extended or adjusted under 35 U.S.C. 154(b) by 74 days.

This patent is subject to a terminal disclaimer.

(21) Appl. No.: 09/873,836

(22) Filed: Jun. 4, 2001

(65) Prior Publication Data

US 2002/0019737 A1 Feb. 14, 2002

Related U.S. Application Data

(63) Continuation-in-part of application No. 09/255,624, filed on Feb. 19, 1999, now Pat. No. 6,243,684.

(51) Int. Cl.[7] ............................................... G10L 21/00
(52) U.S. Cl. ..................... 704/275; 379/88.01; 704/246
(58) Field of Search .................. 704/275, 246, 704/270, 251; 379/88.01

(56) References Cited

U.S. PATENT DOCUMENTS

| | | | |
|---|---|---|---|
| 4,054,756 A | 10/1977 | Comella et al. | |
| 4,164,025 A | 8/1979 | Dubnowski et al. | |
| 4,423,291 A | 12/1983 | Zwicker et al. | |
| 4,589,107 A | 5/1986 | Middleton et al. | |
| 4,593,157 A | 6/1986 | Usdan | |
| 4,644,107 A | 2/1987 | Clowes et al. | |
| 4,677,609 A | 6/1987 | Piereth et al. | |
| 4,686,698 A | 8/1987 | Tompkins et al. | |
| 4,782,509 A | 11/1988 | Shepard | |
| 4,797,910 A | 1/1989 | Daudelin | |
| 4,815,121 A | 3/1989 | Yoshida | |
| 4,847,829 A | 7/1989 | Tompkins et al. | |
| 4,866,756 A | 9/1989 | Crane et al. | |
| 4,870,686 A | 9/1989 | Gerson et al. | |
| 4,918,322 A | 4/1990 | Winter et al. | |
| 4,939,771 A | 7/1990 | Brown et al. | |
| 4,943,995 A | 7/1990 | Daudelin et al. | |
| 4,979,206 A | 12/1990 | Padden et al. | |
| 5,014,267 A | 5/1991 | Tompkins et al. | |
| 5,014,303 A | 5/1991 | Velius | |
| 5,095,505 A | 3/1992 | Finucane et al. | |
| 5,101,425 A | 3/1992 | Darland et al. | |
| 5,163,083 A | 11/1992 | Dowden et al. | |
| 5,163,087 A | 11/1992 | Kaplan | |
| 5,165,095 A | 11/1992 | Borcherding | |
| 5,181,237 A | 1/1993 | Dowden et al. | |
| 5,210,789 A | 5/1993 | Jeffus et al. | |
| 5,293,452 A | 3/1994 | Picone et al. | |

(List continued on next page.)

Primary Examiner—Tālivaldis Ivars Šmits
Assistant Examiner—Angela Armstrong

(57) ABSTRACT

A method and apparatus utilizes a personal speech recognition system to enable data retrieval assistance operators to retrieve customer requested information from an information database based upon a voiced inquiry by the operator. Instead of requiring an operator to interpret a calling customer's request and communicate the same to a computer via a number of keyboard strokes, the live operator may submit the same or equivalent inquiry via a voice utterance that is recognized by the searching computer as a searchable inquiry by a speech recognition system, which is preferably trained to recognize the particular voice of the live operator. Only the voice of the live operator needs to be identified by the voice recognition unit, and the incorporation of the voice recognition technology into the system is thus transparent to the requesting customer. Once the appropriate data is found, the information is released to the requester in a conventional manner, automatically, or after a particular voice command is uttered by the live operator to the computer.

20 Claims, 5 Drawing Sheets

U.S. PATENT DOCUMENTS

| | | |
|---|---|---|
| RE34,587 E | 4/1994 | Crane et al. |
| 5,309,504 A | 5/1994 | Morganstein |
| 5,309,505 A | 5/1994 | Szlam et al. |
| 5,353,336 A | 10/1994 | Hou et al. |
| 5,369,685 A | 11/1994 | Kero |
| 5,488,652 A * | 1/1996 | Bielby et al. .......... 379/213.01 |
| 5,553,119 A | 9/1996 | McAllister et al. |
| 5,566,229 A | 10/1996 | Hou et al. |
| 5,594,784 A | 1/1997 | Velius |
| 5,812,638 A | 9/1998 | Muller |
| 5,839,107 A | 11/1998 | Gupta et al. |
| 5,892,820 A | 4/1999 | Armstrong et al. |
| 5,987,414 A | 11/1999 | Sabourin |
| 6,243,684 B1 * | 6/2001 | Stuart et al. ................. 704/246 |

* cited by examiner

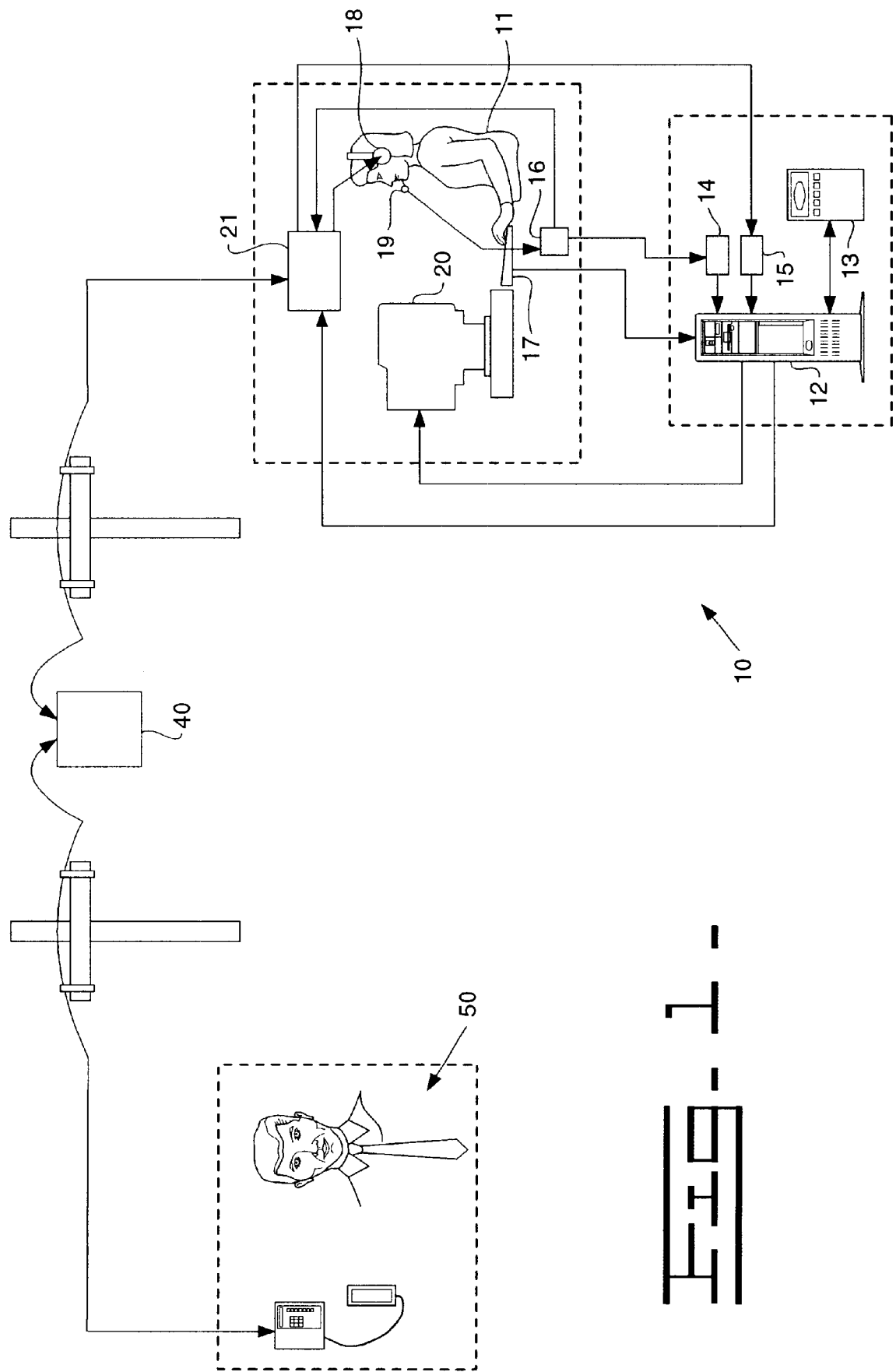

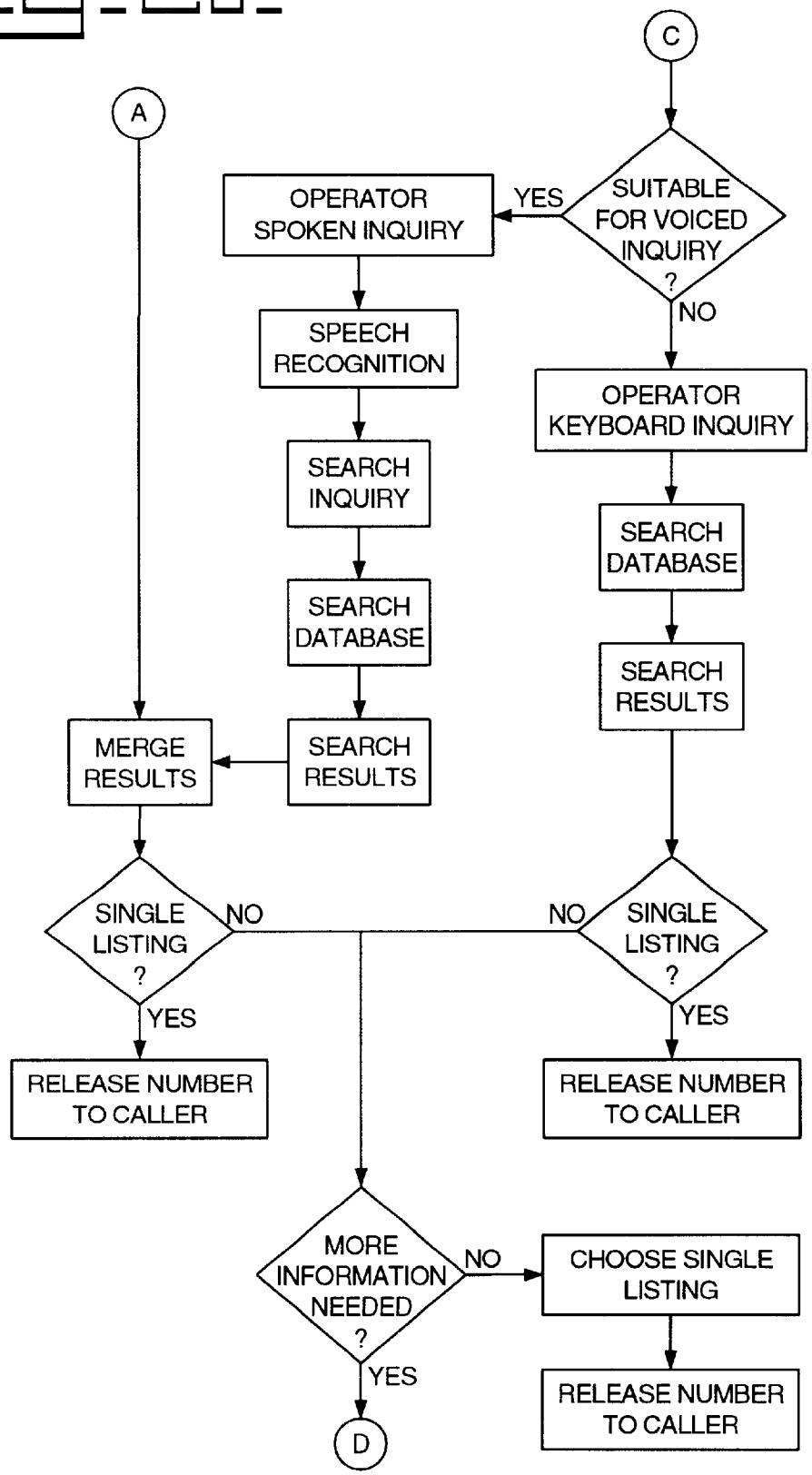
Fig_2b_

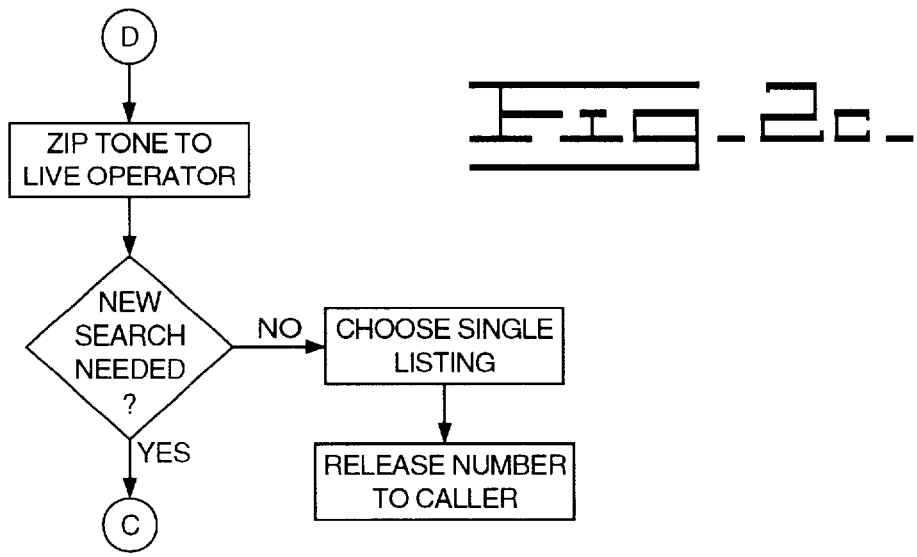
FIG-2c-
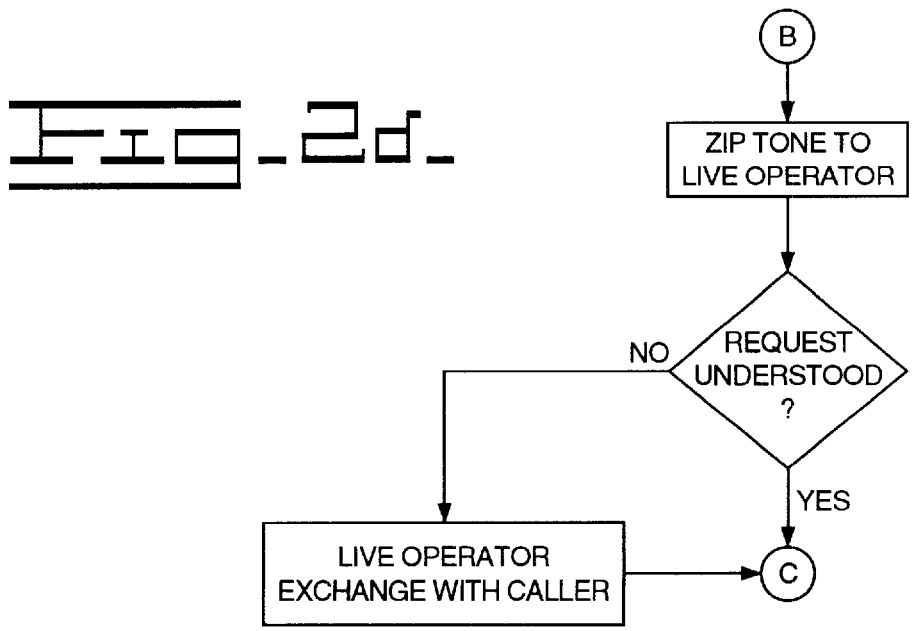
FIG-2d-

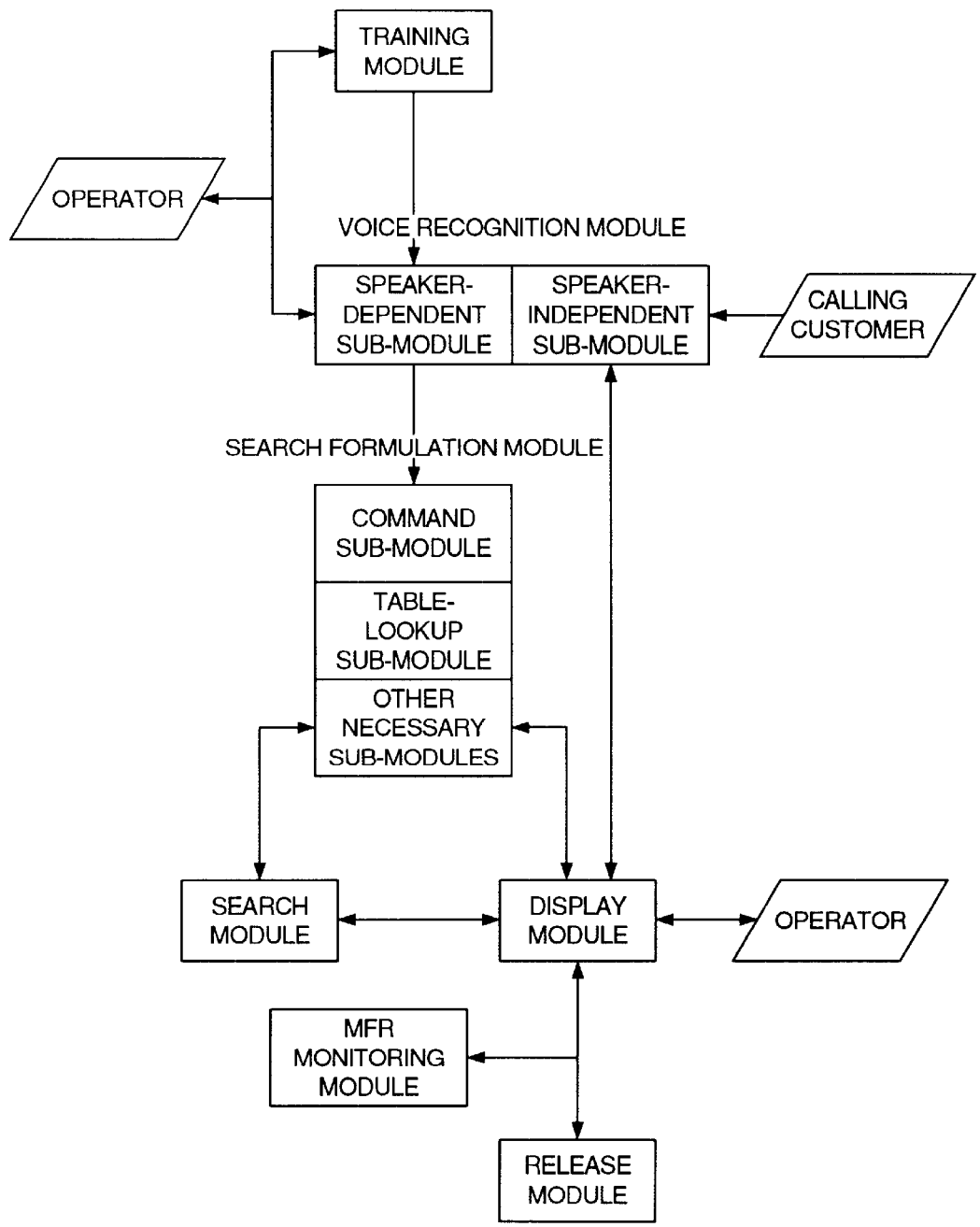

DATA RETRIEVAL ASSISTANCE SYSTEM AND METHOD UTILIZING A SPEECH RECOGNITION SYSTEM AND A LIVE OPERATOR

RELATION TO OTHER PATENT APPLICATION

The present application is a continuation in part of application Ser. No. 09/255,624 filed Feb. 19, 1999 and entitled Directory Assistance System and Method Utilizing a Speech Recognition System and A Live Operator, now U.S. Pat. No. 6,243,684.

TECHNICAL FIELD

The present invention relates generally to methods, software, and apparatuses for providing requested information from a database, and more particularly to providing a speech recognition interface between a live data retrieval assistance operator and a computer database.

BACKGROUND ART

The telecommunications industry is constantly seeking ways of reducing the high labor costs associated with operator assisted calling services while simultaneously increasing customer satisfaction. Because of the need to reduce labor costs, the trend in operator assisted call management is to automate as much of the task as practicable without sacrificing customer satisfaction. For instance, in some cases the caller is greeted and prompted for information by a recording made in the voice of a live operator, who comes on line shortly before the caller utters his or her request. Such a system improves efficiency and lowers labor costs because the automated response reduces operator work time and reduces operator fatigue by automating this initial greeting phrase. This type of automated response increases customer satisfaction because the partial automation of the system is transparent to the caller; the caller hears only one voice and is unable to distinguish the recorded message from the live operator.

In most current day systems, the operator interprets the calling customer's request and then communicates with a computer-based search algorithm and stored database via a conventional keyboard. The computer forwards the search results to the operator's screen, and the live operator releases the selected listing to the caller via an audio response system if an exact match has been found by the computer. If the computer finds multiple listings that match the search request, the live operator must then question, suggest, or identify the number with the caller's assistance. If the customer accepts one of these numbers, the call is released to the audio response system. If the customer does not accept one of these numbers, the operator often must give the caller a nothing found report, or engage in a second search if additional listing details are provided by the customer.

In an effort to further reduce labor costs, there have been numerous attempts to fully automate a telephone directory assistance system through the use of voice recognition technology and other technological advancements. For instance, U.S. Pat. No. 5,479,488 to Lennig et al., U.S. Pat. No. 5,659,597 to Bareis et al. and U.S. Pat. No. 5,638,425 to Meador, III et al. all teach automated directory assistance systems that rely upon a computer to play recorded prompts to the caller and then interpret the caller's responses with a speech recognition system. While such systems can conceivably lower labor costs, they unfortunately can result in a large decrease in customer satisfaction because speech recognition technology is not yet capable of effectively recognizing the voices of the entire pool of calling customers. In addition, even if the words spoken by the caller are recognized, there remains a significant probability that the computer will be unable to understand and translate the recognized words into a searchable query. Because of these shortcomings, automated systems must often rely upon live operators to act as backups when the automated system fails. Even when these systems perform correctly, customer satisfaction is often reduced because it is generally difficult to make the operation of such a system so transparent that the calling customer is unable to realize that they are communicating with a machine rather than a live operator assistant.

It should therefore be understood that the overall success of a directory assistance system requires an appropriate balancing of a variety of competing interests including calling customer satisfaction, job satisfaction of live operator assistants, labor and equipment costs associated with the system, and the satisfaction of subscribers who often pay to have their number listed with the director assistance service (e.g. Yellow Pages). Thus, the primary dimensions by which the success of a directory assistance system may be measured include: increasing the number of correct listings given by the system to caller requests; correspondingly decreasing the number of incorrect listings given out and thereby lessening the costs to the subscribers who pay for the service, if applicable; improving the interface between calling customers and the operator so that the utilization of new technology is transparent to the calling customer; and finally, improving the qualitative aspects of the live operator's job by introducing appropriate technology. Finally, in the telephone industry, every second, or a portion of every second saved per call can mean a literal savings of hundreds of thousands of dollars annually.

Apart from directory assistance, many industries maintain computer databases that contain information needed by requesters for some purpose. These requesters may be in house customers, or might be outside customers seeking information for payment of a fee. Because access to these databases is often restricted, and because the database often includes a relatively complex structure rendering it difficult to search, a live operator with knowledge of the database contents and structure is often positioned between the information requestor and the computer database. These live operators interpret identifying information provided by a requester and translate that information into a searchable inquiry that is communicated to a searching means having access to the information database. Like the directory assistance systems discussed above, there is a desire to further automate these data retrieval systems while maintaining or increasing requestor satisfaction and/or the accuracy and/or timeliness of information provided to the requester.

The present invention is directed to improving upon these and other aspects of data retrieval assistance systems.

DISCLOSURE OF THE INVENTION

In one embodiment, a data retrieval assistance system provides requested information to a requester based upon identifying information provided by the requester to the system. The system includes means for conveying the identifying information to a live operator, such as by a direct communication link or by playing back recorded requester information to the live operator. A computer has access to an information database, and a means for searching the information database in response to an inquiry. A voice communication interface from the live operator to the computer includes a speech recognition system capable of converting a spoken inquiry from the live operator into an interpreted searchable inquiry that is available to the means for searching. Preferably, the speech recognition system is personalized and trained to recognize the specific live operator, and the operator preferably has some insight into the database structure and the searching algorithms used by the computer. In this way, overall system reliability can be improved while retaining the perceived live contact that requesters desire and have come to expect.

In another embodiment of the present invention, a method of data retrieval assistance provides requested information, which capable of being stored and retrieved from a computer database, to a requestor based upon identifying information provided by the requester. The method includes the initial steps of establishing a communication link with the requestor, and then conveying the identifying information provided by the requestor to a live operator. A speech recognition system is positioned between the live operator and a computer that has access to an information database. The database is searched at least in part in response to a spoken inquiry by the live operator to the computer via the speech recognition system, wherein the spoken inquiry is an interpretation of the identifying information provided by the requester. The method is completed by providing the search result to the requestor.

In still another embodiment of the present invention, a software program executable on a computer processor is used to aid a data retrieval assistance operator in retrieving desired data from an information database. The software includes a means for speech recognition that is preferably trainable to recognize the speech of an individual data retrieval assistance operator. The software also includes a means for searching the information database based upon a spoken inquiry to the means for searching. Finally, the software includes a means for providing to the requester the results of a search of the information database.

One object of the invention is to introduce additional automation into data retrieval assistance systems while making the introduction of this technology transparent to the requester.

Another object of the present invention is to increase the number of correct data given out by the data retrieval system while reducing system costs and operator work time.

Still another object of the present invention is to improve the live operator's job by reducing the hand and wrist stress associated with repeatedly typing requester search requests and search commands.

Another object of the present invention is to reduce costs by reducing the amount of time spent on each data retrieval request, preferably without undermining requester satisfaction.

BRIEF DESCRIPTION OF THE DRAWINGS

FIG. 1 is a schematic illustration of a data retrieval assistance system according to the preferred embodiment of the present invention.

FIGS. 2a–d are a flow diagram illustrating the operation of the data retrieval assistance system of FIG. 1 according to a preferred embodiment of the present invention.

FIG. 3 is a block diagram illustrating the various software submodules according to one aspect of the present invention.

CURRENT DIRECTORY ASSISTANCE SYSTEMS

Figure 2A:
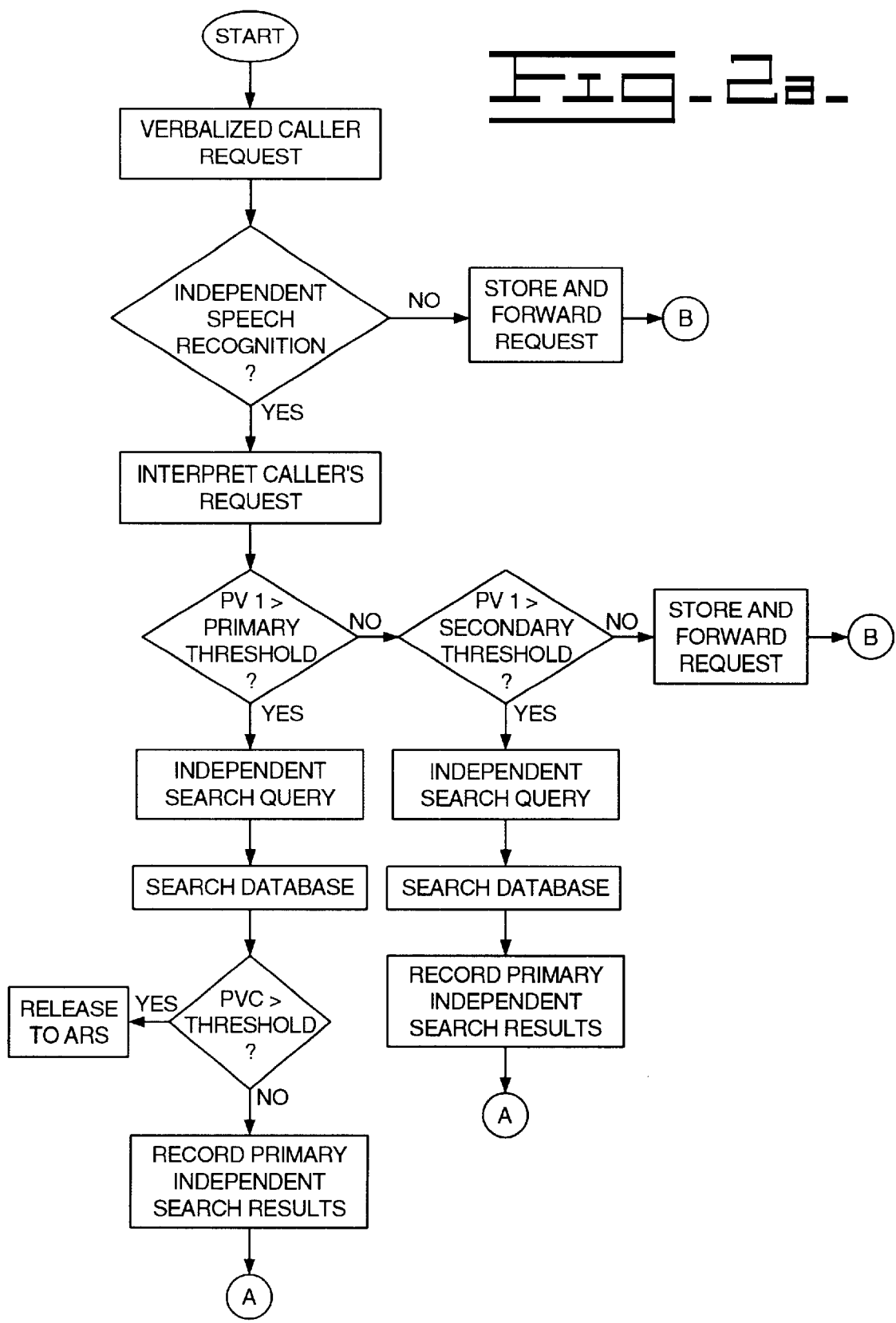

In order to more easily appreciate the present invention in terms of its impact on the existing directory assistance call handling systems, it is necessary to situate this invention within the information flow of a typical call handling process. The entire sequence of events from customer initiation of the call to listing release from the operator position can be divided into three distinct stages. Stage 1 consists of those events that presently occur prior to the operator handling any call detail. Stage 2 consists of those events that presently occur from the point when the operator first has knowledge of any call detail to the point where the operator releases the call from the operator position. Stage 3 consists of those events that presently occur after the call has been released from the operator position.

During stage 1, a caller dials a predetermined directory assistance number and is connected to an automated directory assistance station. Once connected to this directory assistance station, a voice processing unit requests the caller to speak the name and location of the sought subscriber. Utilizing present day voice recognition technology, the voice processing unit attempts to interpret the information supplied by the calling customer and formulate a searchable inquiry in order to retrieve the desired listing from the database. A threshold algorithm is utilized to assign a confidence level, or probability value, to each of the retrieved listings from the database. The threshold algorithm performs two distinct, but similar functions. First, the threshold algorithm compares the probability value that the word or words interpreted by the voice processing unit are the same word or words requested by the caller. For purposes of this discussion, this first probability value will be called PV1. If the threshold algorithm determines that the probability value of the interpreted words exceeds the predetermined threshold level, i.e. if PV1 is high enough, then a search is conducted of the database utilizing the interpreted words. Most importantly, however, if PV1 does not meet the statistical threshold, no search of the database is conducted and the caller is transferred to a live operator.

If an automated search is conducted, then the second function of the threshold algorithm is to analyze the results of this search according to the probability that one of the retrieved listings is in fact the desired listing. For purposes of this discussion, this second probability value will be called PV2. This second probability may be based in part, for example, on the number of cities within a relevant geographical area that possess similar names. Based on the initial probability value that the actual word or words searched are those word or words requested by the caller (PV1) and the second probability value that the retrieved listing is the desired listing (PV2), the threshold algorithm calculates an overall probability value for every listing that is retrieved during the search that that particular retrieved listing is the requested listing. For purposes of this discussion, this combined probability value will be called PVC.

If a single match is found that meets the statistical threshold, i.e. if the PVC is high enough, then the caller is released to the Audio Response System (ARS). If multiple listings are retrieved that meet the statistical threshold, then, presumably, the listing with the greatest PVC is given to the caller. If no listings are retrieved that meet the statistical threshold, then the voice processing unit advises the caller to access an operator or automatically connects the user to an operator.

Whether the caller places a call directly to a live operator or the caller has been transferred to a live operator from the voice processing unit, all of the calls to a live operator are routed to an ACD switch. This ACD switch receives the incoming calls, queues the incoming calls, and monitors the operator positions for busy or idle conditions. If the caller has dialed the live operator directly, the ACD switch delivers a generic greeting phrase and prompt to the customer. Preferably, the greeting phrase and prompt are pre-recorded messages made in the voice of the live operator in order to automate the initial portion of the process in a way that is transparent to the calling customer. However, the greeting phrases may be generic pre-recorded voices played to the customer prior to the call being delivered to an operator position. This initial message typically includes a greeting phrase and a request for the name of the city and other call request details. If the call is routed automatically to the live operator from the voice processing unit, the details of the caller's directory request are recorded and transferred with the call to the ACD switch. When the ACD switch determines that an operator is available to handle a call, the ACD switch connects the call to an idle position and provides a "zip" tone to the operator indicating that a customer is on the line.

Stage 2 begins when the live operator first has knowledge of a call being connected to the operator position. The live operator is notified of a call connection by a "zip" tone. The call details of the customer's request are speech compressed, recorded, and played back to the live operator. Over a number of years, many calling customers have come accustomed to responding to the "What city?" prompt by reciting the city and quickly thereafter uttering identifying information for a listing request without any additional prompting. Typically, the request should include the business name or last name, the first name or initial and the street address if known. The operator then must key, or type, the customer's request on the keyboard/inquiry screen at the operator workstation utilizing available search fields, and often a specific keying strategy. A keying strategy refers to those methods and procedures used by operators to enter data into search fields on an inquiry screen.

After the operator inputs the appropriate information, the operator depresses one of several keys on the console to launch the search. The possible keys used to initiate the search can correspond to separate databases into which the entire listings database is logically divided. For instance, separate databases might include regular listings, residential listings, most frequently requested (MFR) listings, state government listings, and federal government listings, etc.

The computer will search the database using the queried search fields and will display the results of the search on the operator's screen. The operator then analyzes the screen and makes a decision. If a correct match has been found by the computer, the operator releases the call to an audio response system (ARS). If the computer finds and displays multiple listings that may match the search request, the operator may either choose one of the listings or might question, suggest, or identify a single number from among those retrieved with the caller's assistance. If the customer accepts one of these numbers, the caller is released to the ARS. If the customer does not accept one of these numbers, the operator must either give the caller a nothing found (NF) report, or extend the search by changing, adding, or deleting the keying details, or other known methodologies. In order to reduce the time involved in directory assistance database information retrieval, many different search methodologies have been developed.

Perhaps the portion of the present call handling system that is most critical to understanding the novelty and effectiveness of the present invention relates to the retrieval of most frequently requested (MFR) listings. It is believed that, in some instances, no more than a few hundred listings can account for 40% of all requests in a directory assistance database having literally hundreds of thousands of numbers. These numbers represent the MFR listings. Thus, an improvement in the retrieval of a small fraction of the total database that correspond to MFR listings could correspond to a relatively large improvement in the overall operation of a directory assistance system.

Stage 3 of the operation begins when the operator determines that the call should be released, and involves events that presently occur after the release. In a typical case, the operator depresses the release key which causes the auto response system to mechanically voice the results to the calling customer.

The novelty of the present invention is readily apparent when the invention is placed in the context of the information flow of a typical directory assistance call handling process as described in detail above. The current art as practiced utilizes independent voice recognition technology to attempt to interpret a customer's request from the entire pool of calling customer voices. All of these types of independent voice recognition systems are located in Stage 1 of the call handling process and occur prior to the operator having any knowledge of the call. In contrast, the present invention preferably utilizes a speaker-dependent voice recognition application that is situated in Stage 2 of the call handling process. The present invention is preferably trained to interpret specific vocabulary in the live operator's voice and not the universe of possible utterances and entire pool of calling customer voices.

Although the present invention situates its speaker-dependent voice recognition application within Stage 2 of the call handling process, the present invention does envision modifying the statistical threshold process utilized by existing technologies during Stage 1 of the call handling process. It is presumed that current voice recognition systems are capable of setting whatever confidence level, or probability value, that is necessary to ensure that correct listings are given at a pre-determined level. Understandably, this confidence level needs to be high enough to ensure that good customer service is given. In a preferred embodiment of the present invention, a second threshold algorithm is overlaid on the current Stage 1 process and modifies the search process in the following manner: Without the present invention, if PV1 does not meet the pre-determined statistical threshold, then no search is conducted of the database. Under the modified search process of the present invention, the present invention establishes a secondary threshold level for PV1. This secondary threshold level may be significantly lower than that threshold level required by the primary PV1. The result of overlaying a second threshold at a much lower level is to force the Stage 1 search mechanism to search the database using the interpreted words when it would not normally do so. The purpose for conducting this search, which retrieves listings that are statistically not acceptable under the independent-speaker recognition system, is to generate listings that will be later merged with the results of the speaker-dependent search. It is important to note that these Stage 1, statistically unacceptable search results are generated only to be passed on to the present invention for analysis; these listings will not be given to the caller at this point, if at all. The rationale for performing this second level search is to augment the results obtained under the speaker-dependent search by providing an additional, incremental level of statistical significance to the search results. Although in the preferred embodiment of this invention this secondary speaker-independent search using the invention's lower threshold algorithm is performed during Stage 1 of the call handling process, it could also be performed during Stage 2 simultaneously with the speaker-dependent search. No matter where this secondary search is performed, however, it is important to remember that the results of this secondary search are uniquely meaningful to this invention.

If the caller does require live operator assistance, the caller, the associated call details of the caller's request, and the results of the speaker-independent voice processing unit search, if any, are transferred to the ACD switch. In the preferred embodiment of the invention, the caller may have no knowledge that a live operator has intervened in the call handling process. In keeping with the goal of making automated processes as transparent as possible to the calling customer, the call details of the calling customer's request are sent to the live operator without the knowledge of the calling customer. For purposes of this invention, the term "attach" will be used to describe the process whereby the call is sent to a live operator without the caller having any knowledge of a live operator. The term "connect" will be used to describe the process whereby the call is sent to a live operator and the caller does have knowledge that the call has been transferred to a live operator. Once the ACD switch attaches the call to the live operator, the operator listens to the recorded and compressed speech of the calling customer's request and vocalizes the essential search words or phrases and commands to the invention's speaker-dependent voice processing unit. The invention will then formulate an appropriate search, conduct the search, and display the search results to the operator's display screen. The search results of this operator-initiated, speaker-dependent search are compared to the original results of the caller-initiated, speaker independent search. When taken together, the combined search results under the present invention increase the overall confidence level that the retrieved listing is the correct listing to almost one hundred percent.

In the preferred embodiment of the invention, when the call is released to the invention's speaker-dependent voice recognition search module, the original operator that initiated the search may be assigned a new customer with a new search request. If the original search is successful and the desired listing is found, the original caller is routed to the Audio Response System. If the desired listing is not found, the call is connected to the original operator if that original operator is idle or available to handle the call. If the original operator is not available to handle the call, the original call is routed to the ACD server and the call is connected to the next available operator. The advantage of having the original operator handle a new call while the original call is being processed is the gain in operator productivity or efficiency achieved by eliminating the computer search time from the original operator's work time.

In the unlikely event that the combined results from the caller-initiated speaker independent attempt and the operator-initiated speaker dependent search fail to retrieve the desired listing, the caller will be connected to a live operator. The operator then may prompt the caller for more call details and/or utilize normal search practices.

BEST MODE FOR CARRYING OUT THE INVENTION

Referring now to FIG. 1, a data retrieval system includes telephone directory assistance system 10 having many features commonly encountered in current systems in use today. For instance, a computer 12 has access to a memory device 13 containing one or more telephone directory databases, or other types of information databases. As in typical current systems, a live operator 11 has the ability to communicate with computer 12 via a conventional keyboard 17, and computer 12 has the ability to communicate with operator 11 via information displayed on a video terminal screen 20. The operator 11 communicates with a telephone 21 via a conventional headset that includes a headphone mounted speaker 18 and a microphone 19. Telephone communication device 21 is connected to a calling customer 50 via a telephony switch server 40. In this way, operator 11 can be within a call center operation or independently located and connected by telephony switch server 40 via a public communications channel, such as the internet, or a private or virtual private circuit, such as a dedicated line, integrated services digital network, or frame relay access device. In any event, this communication connection is transparent to the calling customer. However, this server strategy can permit a live operator to work at independent locations such as out of their homes, and possibly allow for the employment of other difficult to access persons such as elderly and/or handicapped persons that have difficulty traveling to and from a central operations center.

Directory system 10 is unlike prior art systems in that a voice communication interface 14, which includes a speech recognition system, is positioned to allow operator 11 to communicate with computer 12 via voice utterances into microphone 19. Preferably, the speech recognition system is personalized and trained to recognize the particular voice of operator 11 in order to minimize errors and speed processing. In addition to preferably being trained to recognize the individual voice of an individual directory assistance operator, the system is also preferably trained on a specific vocabulary, such as Commands, MFR listing keywords, and/or yellow pages listing headings. In the preferred embodiment, a switch 16 allows operator 11 to switch between voice communication with computer 12 or the calling customer 50. However, in some instances it may be desirable to allow the calling customer to hear the operator's voice communications with computer 12 in order to educate the public over time as to how their requests are converted into a spoken inquiry suitable for searching by computer 12.

In order to further improve the accuracy of data listing retrievals, the present invention also preferably positions a direct voice communication interface 15 between the calling customer 50 and computer 12. Direct voice communication interface 15 includes an independent speech recognition system capable of converting the identifying information spoken by the calling customer into an independent searchable inquiry that is available to the means for searching within computer 12. Those skilled in the art will appreciate that voice interfaces 14 and 15 could include separate hardware and/or be at least partially incorporated via known software subroutines into the overall software operation of computer 12.

The present system produces more accurate results by relying upon two separate searches, one of which is based upon a search inquiry formulated by a live operator and is a speaker-dependent search and the other by a search inquiry formulated by a machine and is a speaker-independent search. The latter being, for example, one of the totally automated systems described in the prior patents identified above. The separate search results are preferably merged using known statistical means and displayed on video terminal 20 for review by live operator 11. Depending at least in part upon the sophistication of live operator 11, the results may be displayed separately on a split screen or may be merged in a way that applies an appropriate weighting to the results of each search. In addition, the computer might communicate to live operator 11 via video terminal 20 the probability that any retrieved listing accurately matches the request of the calling customer. In some instances, it may be desirable to automatically release a listing to a calling customer if its accuracy probability is above some pre-determined threshold. Because of currently recognized difficulties in voice recognition systems to correctly identify millions of different customers' voices and different dialects, directory assistance system 10 will likely continue to rely heavily on the results produced by the live operator inquiry.

System Operation

Referring now in addition to FIGS. 2a–d, the operation of system 10 will be illustrated. Incoming directory assistance calls are routed to an automated directory assistance station. Once connected to this directory assistance station, a voice processing unit requests the caller to speak the name and location of the sought subscriber. Based upon what the customer utters in response to the initial prompt, the direct voice communication interface 15 utilizes independent speech recognition technology, which could be similar to that described in prior art patents, and prepares an independent search inquiry for searching the telephone directory database automatically. As discussed previously, the voice processing unit attempts to interpret the information supplied by the calling customer and formulate a searchable inquiry in order to retrieve the desired listing from the database by assigning probability values both to the request as interpreted by the speaker-independent voice recognition unit and to the results of any search that was conducted using the statistically valid interpreted request.

Although the present invention situates its speaker-dependent voice recognition application within Stage 2 of the call handling process, the present invention does envision modifying the statistical threshold process utilized by existing technologies during Stage 1 of the call handling process. As discussed earlier, current voice recognition systems are capable of setting whatever confidence level, or probability value, that is necessary to ensure that correct listings are given at a pre-determined level. Understandably, this confidence level needs to be high enough to ensure that good customer service is given. In a preferred embodiment of the present invention, a second threshold algorithm is overlaid on the current Stage 1 process and modifies the search process in the following manner: Without the present invention, if PV1 does not meet the pre-determined statistical threshold, then no search is conducted of the database. Under the modified search process of the present invention, the present invention establishes a secondary threshold level for PV1. This secondary threshold level may be significantly lower than that threshold level required by the primary PV1. The result of overlaying a second threshold at a much lower level is to force the Stage 1 search mechanism to search the database using the interpreted words when it would not normally do so. The purpose for conducting this search, which retrieves listings that are statistically not acceptable under the independent-speaker recognition system, is to generate listings that will be later merged with the results of the speaker-dependent search. It is important to note that these Stage 1, statistically unacceptable search results are generated only to be passed on to the present invention for analysis; these listings will not be given to the caller at this point, if at all. The rationale for performing this second level search is to augment the results obtained under the speaker-dependent search by providing an additional, incremental level of statistical significance to the search results. FIG. 2x illustrates the operation of the overlaid statistical threshold portion of this invention.

If the search finds a suitable match in the directory assistance database, the caller is released to the Audio Response System (ARS). If no suitable match is found, the independent search results, if any, gained from this automatic search of the database are then recorded for later merging with search results obtained by the live operator, and possibly are displayed on the live operator's screen. The voice processing unit then advises the caller to access an operator or automatically connects the user to an operator.

Whether the caller places a call directly to a live operator or the caller has been transferred to a live operator from the voice processing unit, all of the calls to a live operator are routed to an ACD switch. This ACD switch receives the incoming calls, queues the incoming calls, and monitors the operator positions for busy or idle conditions. If the caller has dialed the live operator directly, the ACD switch delivers a generic greeting phrase and prompt to the customer. A greeting phrase and prompt, preferably in the recorded voice of the live operator, is then played back for the calling customer. For instance, the calling customer might hear what seems to be a live operator state "What city please?". Those calling customers familiar with directory assistance will typically respond by stating a string of identifying information that is sufficient to retrieve a single listing without further prompting. For instance, a customer might respond to the prompt by stating something on the order of "Indianapolis," and then, "Eli Lilly Headquarters," "Indianapolis Power and Light," or "IPL," etc. Less sophisticated calling customers will simply respond with the name of their city of interest and await further prompting before providing additional identifying information. Preferably, the greeting phrase and prompt are pre-recorded messages made in the voice of the live operator in order to automate the initial portion of the process in a way that is transparent to the calling customer. However, the greeting phrases may be generic pre-recorded voices played to the customer prior to the call being delivered to an operator position. This initial message typically includes a greeting phrase and a request for the name of the city and other call request details.

If the call is routed automatically to the live operator from the voice processing unit, the details of the caller's initial identifying information is digitally stored and preferably processed, such as by being compressed, before being played back to the live operator. Preferably, a conventional "zip" tone alerts the live operator immediately before the caller's request is automatically played back to the live operator into the live operator's headset 18.

Once the live operator is notified of a call connection by a "zip" tone, the call details of the customer's request are played back to the live operator. Over a number of years, many calling customers have come accustomed to responding to the "What city?" prompt by reciting the city and quickly thereafter uttering identifying information for a listing request without any additional prompting. Typically, the request should include the business name or last name, the first name or initial and the street address if known. The operator then decides whether the caller has provided sufficient identifying information to perform a search, and whether the operator understands the caller's request.

Whether an operator has sufficient identifying information to perform a search is somewhat related to the level of the operator's insight on the search database, what search fields are available, and an assessment of the difficulty in recognizing a specific utterance relating to the caller's request, etc. For instance, when the system is first instituted, the operator will likely only exercise the voiced inquiry option for "Most Frequently Requested" MFR numbers that the operator has had success in retrieving in the past. This will give the operator a relatively high confidence level that certain utterances will retrieve the desired listing. This will permit the automated aspect of the present invention to be introduced with the system only having a limited MFR vocabulary. As software sophistication improves, and operators become more accustomed to using the automated aspects of the present invention, higher percentages of directory assistance calls can be processed using the method of the present invention. In any event, the present invention envisions the need to include a live operator in the directory assistance system for the foreseeable future. For instance, if the customer's request relates to, for example, seeking the residence of a person with a difficult to pronounce foreign last name, the operator will likely choose to formulate a search request and transmit the same to the computer via a conventional keyboard generated search inquiry.

If the operator does not have sufficient identifying information to perform the search, the live operator can activate microphone 19 to communicate directly with the calling customer to prompt as necessary in order to obtain sufficient identifying information from the caller to prepare a searchable inquiry for the telephone directory database. These prompts can be live or pre-recorded as best determined by the operator in a particular situation.

In order to assist the live operator in retrieving desired listings via a voiced inquiry, the directory database can be horizontally expanded to include additional search fields, such as yellow pages subheadings under which listings would be expected to appear. Furthermore, additional search fields could be provided for companies that include numerous listings for different key offices, such as main office, accounting, purchasing, etc. The operator can move between search fields by manual tabbing and/or brief pauses or the verbal equivalent of a keyboard tab input. In addition, the operator may submit a voiced inquiry search to the computer either by typing an appropriate key for a particular database, or by uttering some pre-determined equivalent to command the same operation, or a combination of both.

The computer will search the database using the queried search fields and will display the results of the search on the operator's screen. The operator then analyzes the screen and makes a decision. If a correct match has been found by the computer, the operator releases the call to an audio response system (ARS). If the computer finds and displays multiple listings that may match the search request, the operator may either choose one of the listings or might question, suggest, or identify a single number from among those retrieved with the caller's assistance. If the customer accepts one of these numbers, the caller is released to the ARS. If the customer does not accept one of these numbers, the operator must either give the caller a nothing found (NF) report, or extend the search by changing, adding, or deleting the keying details, or other known methodologies.

Perhaps the portion of the present call handling system that is most critical to understanding the novelty and effectiveness of the present invention relates to the retrieval of most frequently requested (MFR) listings. It is believed that, in some instances, no more than a few hundred listings can account for 40% of all requests in a directory assistance database having literally hundreds of thousands of numbers. These numbers represent the MFR listings. Thus, an improvement in the retrieval of a small fraction of the total database that correspond to MFR listings could correspond to a relatively large improvement in the overall operation of a directory assistance system.

In the past, because operators often become very well acquainted with MFR listings, they will oftentimes type in a single line identifier from memory in response to a caller's request. There are at least two problems with this method that the present invention obviates. First, if the MFR lists are updated and changed, each entry on the MFR list may receive a new line identifier. If the operator continues to type a line identifier from memory rather than executing a new search each time, the operator will invariably give out wrong numbers to callers. With the present invention, the operator does not type a line identifier; rather, the operator speaks the caller's request and the speech recognition system will recognize the request and will then search the MFR database to find the appropriate listing. Because the operator does not type in a line identifier, there is no chance for an operator to type in an incorrect line identifier to retrieve a listing. Preferably, in most cases in which an MFR listing is requested by the calling customer, it will not be necessary for the attendant operator to speak to the calling customer.

In the preferred embodiment of the invention, the caller may have no knowledge that a live operator has intervened in the call handling process. In keeping with the goal of making automated processes as transparent as possible to the calling customer, the call details of the calling customer's request are sent to the live operator without the knowledge of the calling customer. For purposes of this invention, the term "attach" will be used to describe the process whereby the call is sent to a live operator without any interaction occurring between the caller and the operator. The term "connect" will be used to describe the process whereby the call is sent to a live operator and there is interaction between the caller and the operator. Once the ACD switch attaches the call to the live operator, the operator listens to the recorded and compressed speech of the calling customer's request and vocalizes the essential search words or phrases and commands to the invention's speaker-dependent voice processing unit. The invention will then formulate an appropriate search, conduct the search, and display the search results to the operator's display screen. In addition, the interpreted search request is preferably provided to the operator to catch errors before launching a search and to increase operator confidence that the correct search is being performed. The search results of this operator-initiated, speaker-dependent search are compared to the original results of the caller-initiated, speaker independent search. When taken together, the combined search results under the present invention increase the overall confidence level that the retrieved listing is the correct listing to almost one hundred percent.

In the preferred embodiment of the invention, when the call is released to the invention's speaker-dependent voice recognition search module, the original operator that initiated the search may be assigned a new customer with a new search request. If the original search is successful and the desired listing is found, the original caller is routed to the Audio Response System. If the desired listing is not found, the call is connected to the original operator if that original operator is idle or available to handle the call. If the original operator is not available to handle the call, the original call is routed to the ACD server and the call is connected to the next available operator. The advantage of having the original operator handle a new call while the original call is being processed is the gain in operator productivity or efficiency achieved by eliminating the computer search time from the original operator's work time.

In the event that a search retrieves more than one listing, the operator must then determine whether additional information is needed in order to identify the requested listing among those retrieved. In some instances, the operator will have already received sufficient information from the caller to enable the appropriate listing to be chosen from amongst those retrieved. In such a case, the operator chooses a single listing and releases the same to the calling customer via either a manual keyboard command to the computer and/or via some pre-determined voice command.

If the operator has insufficient information to choose a particular listing, the caller must be prompted to provide additional identifying information. Because some dilemmas in this regard appear to occur over and over again, the operator can choose between directly speaking to the calling customer and/or playing back a particular pre-recorded prompt, preferably made in the voice of the live operator to fit the particular situation. For instance, in the case of retrieving multiple listings for a corporation, the pre-recorded voice prompt may indicate this situation to the calling customer and request that a particular office within the corporation be identified. In the event that no listings are found or a single listing among multiple listings cannot be identified for release to the calling customer, a nothing found report might be given to the calling customer, and again this report may be in the form of a pre-recorded message launched by the live operator. Like current systems, the operator may launch a new search if an appropriate request is made by the calling customer. In the unlikely event that the combined results from the caller-initiated speaker independent attempt and the operator-initiated speaker dependent search fail to retrieve the desired listing, the caller will be connected to a live operator. The operator then may prompt the caller for more call details and/or utilize normal search practices.

In addition to the basic concept of positioning a voice recognition system between a live operator and a computer database, the present invention also contemplates further enhancements to directory assistance systems, including but not limited to horizontally expanding the database to include one or more additional fields. For instance, one of the fields in an expanded database might simply be whether the listing is a residence, business, or other, such as a government listing. In another aspect, a business database might include as a field for each listing, the particular yellow pages heading under which that listing would be found in a conventional yellow pages directory. In another aspect, many business listings include several numbers for various aspects of the business. Therefore, the present invention contemplates the possibility of including an additional search field that includes listing details such as terms, including but not limited to showroom, factory, branch office, district, manager, body shop, office, fax, general, division, main number, customer service, headquarters, regional office, sales and service, national, toll free, children, residence, service, etc. Those skilled in the art will appreciate that by expanding a database horizontally to include additional fields, the operator may more easily home in on a particular desired listing, when needed, without searching through a multiple listing retrieval and/or requiring further exchanges of information with the calling customer.

The present invention also contemplates other enhancements such as a verbal or manual "and not MFR" command to reduce the number of displayed listings in the case where the operator knows that the calling customer is looking for a listing that could possibly be confused with an MFR listing. The most frequently requested list can be calculated by time of day, day of week and include seasonal calling characteristics and individual patterns. In effect, each directory assistance operator could have an individual personal speech recognition MFR work tool that is automatically evolved and updated as calling patterns change. In this way, the individual operator's personal speech recognition MFR would very quickly "catch" a new listing advertised on TV with mass calls to 555-1212, or similar numbers. The present invention contemplates that the logic for this aspect would alert, or prompt the operator at the position to add this listing to their personal database. In addition, the present invention also contemplates an audio response unit that provides verbal vanity numbers such as, 1-800-Holiday, or 1-800-465-4329, by the operator simply verbalizing the word "holiday." Since most vanity numbers are MFR numbers, this feature will reduce directory assistance work time and expense. Thus, by a step wise introduction of a personalized voice recognition system trained to specific operators, combined with a step wise addition of vocabulary and associated search fields in the relevant databases, the present invention can incrementally automate higher and higher percentages of the directory assistance call flow volume. In addition, virtually all manually entered commands (e.g. choosing a database or launching a search) can be accomplished with a suitable voice command in the present invention.

In a further embodiment of the invention, the various keywords and commands are intended to be used either independently or in combination on a single call. For example, a single call handled with the present invention could very well use any number of search fields and commands. A particular caller's request may be most effectively handled by combining several of the inventions' keywords. As an example, a caller requests the number for a particular financial company in Indianapolis. The financial company's name begins with the letter "A". If the operator utilizing the present invention vocalizes the combination of keywords "Financial" (from the Yellow Pages classifications) and "Only", the invention would retrieve only numbers listed under the financial classification. In this case, only 2 of the Indianapolis Yellow Pages listings beginning with the letter "A" are financial companies. Because the A to Z Yellow Pages classifications have thousands of listings but less than one percent are financial, the combination command "Financial", "Only" would eliminate ninety-nine percent of the database, significantly increasing the probability of retrieving the caller's desired listing.

System Software

The software program of the present invention combines standard, off-the-shelf software technologies in a unique manner to provide for the full functionality of the invention. The invention is comprised of a number of distinct software program modules or subroutines. (See FIG. 3.) The preferred embodiment of the invention includes, but is not limited to, the following software components: an MFR Monitoring Module; a Training Module; a Voice Recognition module; a Search Formulation Module; a Search Module; a Display Module; and a Release Module.

The Training Module portion of the software program trains the invention to interpret an individual operator's vocalization of preferably three distinct types of words: Commands, Keywords, and MFRs. The operator interacts with the Training Module to record those words and phrases which are necessary to operate the invention and retrieve listings. Depending upon the voice recognition software used and the requirements of the system, the training module is used off-line to train the computer to recognize the voice utterances of a particular operator and/or a closed vocabulary of words. Those skilled in the art will appreciate that a training module is preferred but not essential to the operation of the invention.

The Training Module records various words and phrases in the voice of the operator to allow the Voice Recognition Module to easily interpret the operator's subsequent verbal requests. Commands are those words that, when vocalized by the operator and interpreted by the invention, cause the system to take a specific action. Examples of Commands include, but are not limited to, the following types of words: File names, e.g. "Business," "Residence," "MFR," "Government," "State," "Federal," "Regular," and others; Computer control commands, e.g. "Record," "Stop," "Tab," "Search," "Release," "Page Up," "Page Down," "Delete," "Add," "New," "Disconnect," and others; Search modification commands, e.g. "Other," used for retrieving alternative spellings of a particular name, such as Smith and Smythe, "Extend," used to drop a particular geographical limitation, such as dropping a community name 'Fishers' and extending the search to an entire city, 'Indianapolis,' or used to drop other keyword search fields such as NPA and extending the search to an entire area code; "Only," used to restrict the search to a particular database or field within a particular database; "Abbreviation," used to expand the search to include all of the known or common abbreviations for a particular word, such as Saint and St.; and "Alpha-Numeric," used to expand the search to include both the numeric and alphabetized forms of a particular word, such as 'first' and '$1^{st}$,' or '$21^{st}$ century' and 'twenty-first century.' Thus, commands would include words that were previously entered with keystrokes as well as new words not capable of being entered with keystrokes prior to this invention.

The invention's software program also interprets Keywords vocalized by the operator. Keywords are searchable terms that are placed within new or existing Search Fields in the directory database. The invention presupposes a database which has been horizontally expanded to include the additional new Search Fields. The Search Fields that are preferably added to the database are specific to the invention and are designed to supplement the search technique by narrowing the list of possible listing choices. The types of Search Fields that could be added to the database include, but are not limited, to the following: Sublisting keywords, such as "Main Number," "Fax," "Customer Service," "Toll Free," "Reservations," "Emergency," etc.; Listing identifiers or professional titles, such as "Doctor," "CPA," "Attorney," etc.; Address identifiers, such as "'A–Z' Street," "Highway," "Circle," "Court," "Rural Route," "Avenue," etc.; Directional identifiers, such as "North," "South," "East," "West," and all derivatives of these words, such as "Northeast," etc.; Yellow Pages or business classifications, such as "Financial," "Catalog," "Hotels," "Automobile" or "Car," "Rental," "Wholesale," "Medical," "Airline," "Banking," "Insurance," etc.; Brand name identifiers, such as "Lennox," "Trane," "Carrier," "Sears," etc.; Emergency or critical file identifiers, such as "Fire," "Police," "Sheriff," "Poison Control," "State Police," etc.; and Geographic locator or place names, such as any of the fifty states, cities, towns, counties, townships, etc.

Keywords are those words that are placed within each Search Field to identify the listing. Keywords consist of all those words and/or phrases that the invention has been trained to interpret from an operator's vocalization that rely on a methodology which uniquely categorizes a database listing according to the Search Field parameters. An example of how an expanded database record may be structured using Keywords placed in additional Search Fields is as follows:

| Name | Street | City | State | Category* | Department* | Number Type* |
|---|---|---|---|---|---|---|
| John's Garage | 123 Smith St. | Atlanta | GA | Automotive Sales | | Fax |

*Denotes new Search Fields specific to an expanded database aspect of the invention The MFR database is arguably one of the most advantageous components of the invention's software program. The invention is targeted at a single call attendant and leverages the historical fact that the top 1000 MFR listings represent a large percentage of the total volume of requests handled by an operator. The MFR Monitoring Module of the software program monitors all of the request activity and generates a MFR database comprised of those most-requested listings. The MFR database uses two primary criteria in determining which listings should be in the individual operator's MFR database. The criteria are: (1) the desired number of listings in the database; and (2) the desired period of time to be monitored. It is important to note that the MFR database will always generate a definite and distinct set of listings, although the size and scope of the database may be ever-changing. The software program is capable of monitoring all call activity and providing the optimal combination of the number of listings and period of time to be monitored in creating the MFR database. For example, the software program may determine that the top 100 most frequently requested listings over the past month are generating 20% of all call traffic, or the software program may calculate that the top 500 most frequently requested listings over the past quarter year is generating over 50% of all call traffic. Management is capable of overriding this optimal situation if desired, however. For example, management may decide that an MFR database of over 500 listings is simply too large for the an operator to manage effectively. The software program also possesses the flexibility to generate a unique MFR database size for each individual operator. For instance, a newer directory assistance operator may have a relatively small MFR database, but an experienced operator might have a much larger database. This flexibility would allow individual operators to process more and more of their calls through verbal interaction with the computer database as he or she becomes more familiar with the database and system operation.

Another aspect of the software program is it's ability to provide real-time updates to the MFR database. The software program may indicate that a particular listing is suddenly generating a statistically significant amount of activity. Although the amount of activity generated may not be significant if measured over a long period of monitoring, the software program can recognize that, in the short run, it would be more effective if the listing were added to the MFR database. In a preferred embodiment of the invention, the software program alerts either management or an operator that a particular listing is generating a significant amount of traffic. For example, a business may decide to run a short-term promotion that causes customers to call for that business's number. If the listing is authorized to be added to the MFR database, the operator is notified at the workstation of the new listing. The operator is allowed to go off-line, record the new listing in the operator's own voice and then return on-line. The operator now knows that there is a new listing in the MFR database and that the invention will be able to retrieve the correct listing through a voiced MFR search inquiry.

The Voice Recognition Module consists of a Speaker-Dependent Voice Recognition Sub-Module and a Speaker-Independent Voice Recognition Sub-Module. The Speaker-Dependent Sub-Module interacts with the Training Module to interpret the various verbalized requests of the operator. The primary functions of the Speaker-Dependent Sub-Module are: (1) to interpret the vocal commands given by the operator to run the system and to formulate the structure of the search request; and (2) to interpret the keywords and MFR requests vocalized by the operator to formulate the content of the search request. The Speaker-Independent Sub-Module interacts with current voice recognition directory assistance applications which attempt to interpret and formulate requests from the entire pool of calling customers. The primary functions of the Speaker-Independent Sub-Module are: to monitor the results of the Stage 1 speaker-independent voice recognition unit; to overlay the invention's secondary threshold algorithm, if necessary; and to receive the results of any search that was conducted.

The Search Formulation Module is comprised of a Command Sub-Module, a Table-Lookup Sub-Module, and other necessary sub-modules. The Search Formulation Module receives the interpreted requests from the Speaker-Dependent Sub-Module. Ignoring the possibility of additional search fields in the database, the outputs from the speaker sub-modules should be very similar to current search queries entered manually via a keyboard. The Command Sub-Module processes and executes the vocalized Commands that have been interpreted by the Speaker-Dependent Sub-Module of the Voice Recognition Module. The Table-Lookup Sub-Module processes and formulates the speaker-dependent search using the vocalized Keyword and MFR requests of the operator that have been interpreted by the Speaker-Dependent Sub-Module.

The Search Module receives the speaker-dependent search requests formulated by the Table-Lookup Sub-Module of the Search Formulation Module. The Search Module executes the search requests and passes the information from the results to the Display Module. Additionally, the Search Module is responsible for assigning a probability value to the speaker-dependent search results and is responsible for merging the results of the speaker-dependent search with those of the speaker-independent search.

The Display Module processes the information it receives from the Search Module and outputs the results to the operator's workstation screen in some suitable fashion. In addition, the display module preferably displays the results of the search formulation module so that computer interpretation errors can be detected and corrected before launching a bad search. The Release Module is responsible for releasing the correct listing to the calling customer, and is preferably similar to such modules in current use. This task can be automatic or manually controlled depending upon the results of the search(s) and/or desired system characteristics.

Example Scenarios

In the following example, a calling customer is calling to request the toll free number for Smythe Insurance, a State Farm agency on Meridian Street located in Carmel, Ind. The only information that the calling customer has is that there is a toll free number for an Indiana State Farm insurance company in Indianapolis on Meridian Street. The following two scenarios compare the current directory assistance system with the proposed system utilizing the PSR invention.

Example Call Without Invention

| CUSTOMER REQUEST | OPERATOR ACTION |
| --- | --- |
| "Toll Free Number for Indiana State Farm in Indianapolis on Meridian" | Key - Indiana<br>Key - Indianapolis<br>Key - State Farm<br>Key - Meridian<br>Operator Report - NF |
| Customer Insistence | Keying - Expand to NFA<br>Operator Report - NF |
| Customer Still Insistent No Additional Details | Operator Request - Asks customer for additional details<br>Operator Report - NF |
| OPERATOR WORK TIME: | 36 SECONDS |

Example Call With PSR Invention

| CUSTOMER REQUEST | OPERATOR ACTION |
| --- | --- |
| "Toll Free Number for Indiana State Farm in Indianapolis on Meridian" | Verbalize - "Indianapolis"<br>Key (or Verbalize) - Tab<br>Verbalize - "Business"<br>Key (or Verbalize) - Tab<br>Verbalize - "Insurance"<br>Key (or Verbalize) - Tab<br>Verbalize - "State Farm"<br>Key (or Verbalize) - Tab<br>Verbalize - "Meridian"<br>Key (or Verbalize) - Tab<br>Verbalize - "Toll Free"<br>Operator Release to ARU |
| OPERATOR WORK TIME: | 8 SECONDS |

In comparing the two scenarios, it is important to note that the correct number with a PSR search would find the correct toll free number even without the use of the city designation. The PSR search would also identify the correct listing without the business classification of Insurance, but it improves the accuracy and computer response time by deleting hundreds of Indiana S listings from the search. Even if the non-PSR operator searched just for State Farm the correcting listing would not be found. It would require a Yellow Page search and personal knowledge of the supervisor.

PSR technology will allow the calling customer to obtain correct listings with only partial call details and without exact spellings. The productivity of an operator utilizing the PSR invention will dramatically increase as is shown in the previous example scenarios. In the first example scenario in which a call is handled without utilizing the PSR invention, the operator had to perform multiple searches and was required to type over 30 keystrokes. Despite all of the operator's efforts, a correct listing was still not found using current technology. In the second example scenario in which a call is handled with the PSR invention, the operator performed only a single search and typed only four or five key strokes. In fact, the operator could just as easily verbalized the Tab command instead of keying the command and performed the successful search without a single keystroke. In addition to increased operator productivity, the invention will also increase customer satisfaction by retrieving more correct listings with less information in a shorter amount of time. Finally, the example scenarios demonstrate how the operator's job satisfaction will also increase by significantly reducing customer irritation.

Although the present invention has been illustrated in the context of a directory assistance system, the concepts of the present invention can find potential application in data retrieval assistance systems in a wide variety of industries. Depending upon the particular application, the individual requesting information, the requester, may have identifying information communicated to a live operator in a number of ways that may or may not include a telephone communication link. For instance, identifying information provided by the requester could be communicated to the live operator via an internet connection, via a radio transmission, via voice, via a writing or any other means by which identifying information can be communicated to a live operator. For instance, a requester according to the present invention could be simply an individual seeking to purchase an item offered by a particular company, or an in house requester seeking particular information from an in-house corporate database. The former could relate to catalog sales, travel agent services, internal revenue service, information services, etc. The latter could relate to in-house accessing of banking and/or financial data or possibly even in-house insurance related data. Thus, those skilled in the art will appreciate that the present invention could find potential application in any scenario in which a requestor requests that a live operator retrieve requested information from a database. The present invention is especially applicable in those cases where effective searching of the database requires knowledge of the database structure and/or its contents.

Another potential application of the present invention lies in the retrieval of information accessible over the World Wide Web or internet. A requester might convey identifying information to a live operator in any of a variety of known manners. The live operator might have special knowledge of how various search engines are structure and how best to exploit the advantages of each. The live operator can then communicate with one or more of these search engines with voiced commands and voiced search inquires that may or may not be accompanied by conventional keyed or typed communications to a computer. The present invention finds potential application in almost any situation where a live operator is or could be positioned between a requester of information and a computer database having access to the stored information.

The above description is intended for illustrative purposes only, and is not intended to limit the scope of the present invention in any way. For instance, although the preferred version of the invention was illustrated in the context of a telephone information database, other types of information databases could also be used in the present invention. Thus, various modifications could be made to the disclosed embodiment, without departing from the intended spirit and scope of the present invention, which is defined in terms of the claims set forth below.

What is claimed is:

1. A data retrieval assistance system for providing requested information to a requester based upon identifying information provided by the requester, the system comprising:
   means for conveying said identifying information to a live operator;
   a computer having access to an information database, and means for searching said database in response to an inquiry; and
   a voice communication interface from said live operator to said computer that includes a speech recognition system capable of converting a spoken inquiry from said live operator into an interpreted searchable inquiry that is available to said means for searching.

2. The data retrieval assistance system of claim 1 wherein said means for conveying includes an audio recording apparatus and a playback device.

3. The data retrieval assistance system of claim 1 wherein said speech recognition system is specifically trained to recognize a voice of said live operator.

4. The data retrieval assistance system of claim 1 further comprising a manual communication interface from said live operator to said computer.

5. The data retrieval assistance system of claim 1 further comprising a direct voice communication interface from said requester to said computer that includes an independent speech recognition system capable of converting said identifying information spoken by said requestor into an independent searchable inquiry that is available to said means for searching.

6. The data retrieval assistance system of claim 5 further comprising means for merging a first search result based upon said independent searchable inquiry with a second search result based upon said interpreted searchable inquiry.

7. The data retrieval assistance system of claim 1 further comprising a video display interface between said computer and said live operator that is capable of visually communicating a search result to said live operator.

8. A method of data retrieval assistance for providing requested information to a requestor based upon identifying information provided by the requestor, comprising the steps of:
   establishing a communication link between a directory assistance system and a requestor;
   conveying said identifying information to a live operator;
   positioning a speech recognition system between said live operator and a computer having access to an information database;
   searching said information database at least partially in response to an utterance spoken by said live operator to said computer via said speech recognition system, wherein at least a portion of said utterance is an interpretation of at least a portion of said identifying information; and
   providing a search result to said requester.

9. The method of data retrieval assistance of claim 8 wherein said conveying step includes the steps of:
   recording a requester utterance made by said requester;
   playing back a portion of said requester utterance to said live operator.

10. The method of data retrieval assistance of claim 8 further comprising a step of specifically training said voice recognition system to recognize speech by said live operator.

11. The method of data retrieval assistance of claim 8 further comprising a step of identifying a group of most frequently requested data that is a subset of said information database.

12. The method of data retrieval assistance of claim 11 further comprising the steps of:
   determining whether said identifying information corresponds to one of said most frequently requested data; and
   if said identifying information corresponds to one of said most frequently requested data, then searching said subset of said information database at least partially in response to said utterance spoken by said live operator to said computer.

13. The method of data retrieval assistance of claim 8 further comprising the steps of:

displaying a search result on a view screen visible to said live operator;

choosing a single data group if said search result includes a plurality of data groups; and providing said single data group to said requestor; and at least one of said choosing step and said providing step includes a voiced communication from said live operator to said computer.

14. The method of data retrieval assistance of claim 8 further comprising the steps of:

conveying said identifying information to a direct voice communication interface from said requester to said computer; and converting said identifying information with an independent speech recognition system into an independent searchable inquiry.

15. A software program executable by a computer processor for use in a data retrieval assistance system for providing requested information to a requestor based upon identifying information provided by the requestor, the software comprising:

means for communicating identifying information from a requestor to an individual live operator;

means for training a speech recognition system to recognize words spoken by said individual live operator;

means for converting words spoken by said individual live operator into a searchable inquiry;

means for searching a information database using said searchable inquiry; and means for providing a search result based upon said searchable inquiry to said requestor.

16. The software program of claim 15 wherein said searchable inquiry includes a plurality of keywords distributed into a plurality of search fields.

17. The software program of claim 15 further comprising means for displaying a search result to said individual live operator.

18. The software program of claim 15 further comprising means for interpreting voiced commands spoken by said individual live operator.

19. The software program of claim 15 further comprising means for playing recordings made by said individual live operator to a third party requester.

20. The software program of claim 15 further comprising means for training said speech recognition system to recognize words from a selected vocabulary.

* * * * *